(12) United States Patent
Zhang

(10) Patent No.: US 12,233,722 B2
(45) Date of Patent: Feb. 25, 2025

(54) BATTERY SAFETY ALERT SYSTEM

(71) Applicant: SZ DJI TECHNOLOGY CO., LTD., Shenzhen (CN)

(72) Inventor: Caihui Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 805 days.

(21) Appl. No.: 16/927,521

(22) Filed: Jul. 13, 2020

(65) Prior Publication Data

US 2020/0343599 A1    Oct. 29, 2020

Related U.S. Application Data

(63) Continuation of application No. PCT/CN2018/073445, filed on Jan. 19, 2018.

(51) Int. Cl.
*H01M 50/249* (2021.01)
*B60L 50/60* (2019.01)
(Continued)

(52) U.S. Cl.
CPC .............. *B60L 50/60* (2019.02); *B64D 27/24* (2013.01); *B64D 27/40* (2024.01); *B64U 10/14* (2023.01);
(Continued)

(58) Field of Classification Search
None
See application file for complete search history.

(56) References Cited

U.S. PATENT DOCUMENTS

| | | | | |
|---|---|---|---|---|
| 2010/0112843 A1* | 5/2010 | Heichal | ............... | H01M 50/249 439/299 |
| 2010/0114762 A1* | 5/2010 | Ishii | .................... | H01M 10/488 705/40 |

(Continued)

FOREIGN PATENT DOCUMENTS

| | | |
|---|---|---|
| CN | 104828028 A | 8/2015 |
| CN | 104972926 A | 10/2015 |

(Continued)

OTHER PUBLICATIONS

The World Intellectual Property Organization (WIPO) International Search Report for PCT/CN2018/073445 Oct. 8, 2018 5 pages.

*Primary Examiner* — Yoshitoshi Takeuchi
(74) *Attorney, Agent, or Firm* — ANOVA LAW GROUP, PLLC

(57) ABSTRACT

A battery safety alert system includes a detection device and a controller communicatively connected to the detection device. The detection device is configured to detect position information of an engagement mechanism provided at one of a battery and a battery mounting member. A matching mechanism is provided at another one of the battery and the battery mounting member. The engagement mechanism is configured to engage with the matching mechanism to fix the battery to the battery mounting member. The controller is configured to receive the position information, determine whether the engagement mechanism is fully engaged with the matching mechanism based on the position information, and send out alarm information in response to the engagement mechanism not being fully engaged with the matching mechanism.

20 Claims, 11 Drawing Sheets

(51) Int. Cl.
- *B64D 27/24* (2006.01)
- *B64D 27/40* (2024.01)
- *B64U 10/14* (2023.01)
- *B64U 50/30* (2023.01)
- *H01M 10/48* (2006.01)
- *H01M 50/244* (2021.01)
- *H01M 50/262* (2021.01)

(52) U.S. Cl.
CPC ............ *B64U 50/30* (2023.01); *H01M 10/48* (2013.01); *H01M 50/244* (2021.01); *B60L 2200/10* (2013.01); *B64U 2201/20* (2023.01); *H01M 2220/20* (2013.01)

(56) References Cited

U.S. PATENT DOCUMENTS

| | | | | |
|---|---|---|---|---|
| 2011/0297470 | A1* | 12/2011 | Heichal | B60L 50/66 180/68.5 |
| 2012/0298435 | A1* | 11/2012 | Jaffrezic | B60L 3/0046 180/68.5 |
| 2013/0018610 | A1* | 1/2013 | Yamauchi | H01M 10/425 705/26.61 |

FOREIGN PATENT DOCUMENTS

| | | |
|---|---|---|
| CN | 206077007 U | 4/2017 |
| CN | 106687371 A | 5/2017 |
| CN | 106687374 A | 5/2017 |
| CN | 107077411 A | 8/2017 |
| CN | 107124906 A | 9/2017 |
| JP | 2001176475 A | 6/2001 |

\* cited by examiner

BATTERY SAFETY ALERT SYSTEM

CROSS-REFERENCE TO RELATED APPLICATION

This application is a continuation of International Application No. PCT/CN2018/073445, filed Jan. 19, 2018, the entire content of which is incorporated herein by reference.

TECHNICAL FIELD

The present disclosure relates to the battery safety field, and more particularly, to a battery safety alert system.

BACKGROUND

A battery is an indispensable power supply component in daily life. Whether a battery is securely mounted affects efficiency and safety of daily operation. Specifically, a battery is a very important component for an unmanned aerial vehicle (UAV). Due to the operation nature of the UAV, the battery needs to meet a need for convenient removal and a need for stable and reliable power supply during a connection process. In an actual flight, a slightly loose of the battery may cause the battery to disconnect or the power supply connection to be interrupted, etc., which in a severe case may cause the UAV to crash and hence causing an economic loss, and in a more seriously case may threaten a safety of a ground personnel. The battery being loose can be caused by various reasons, e.g., a user not fully mounting the battery in place before the UAV takes off, or an external interference or self-vibration during a flight of the UAV.

In exiting technologies, some UAVs are provided with a solution for detecting whether an electrical connection between a battery and a body is intact. For example, the battery of a conventional UAV is provided with an in-position signal pin, and an electrical connection socket of the body is provided with an in-position signal detection hole. When the in-position signal pin of the battery is inserted into the in-position signal detection hole of the electrical connection socket of the body, the in-position signal pin inputs an in-position detection signal to notify the UAV that the electrical connection between the battery and the electrical connection socket of the body is intact, so that the UAV can take off normally.

On the other hand, however, the insertion of the in-position signal pin of the battery into the in-position signal detection hole of the electrical connection socket of the body cannot guarantee that the battery is fully mounted in place. For example, sometimes even if the battery is not fully mounted, the in-position signal pin of the battery can still be partially inserted into the in-position signal detection hole of the electrical connection socket of the body, and the UAV still detects that the electrical connection of the battery is normal and takes off normally. Or, even if the UAV takes off normally after the battery is fully mounted, the battery may still become loose during the flight of the UAV. For example, the UAV is slightly impacted, or the UAV is violently shaken in a strong wind environment, which causes the battery to come off from a battery mounting member. Due to the lack of an alert on whether the battery is fixed or not, the looseness of the battery during a flight is often a main reason for a crash of the UAV.

SUMMARY

In accordance with the present disclosure, there is provided a battery safety alert system including a detection device and a controller communicatively connected to the detection device. The detection device is configured to detect position information of an engagement mechanism provided at one of a battery and a battery mounting member. A matching mechanism is provided at another one of the battery and the battery mounting member. The engagement mechanism is configured to engage with the matching mechanism to fix the battery to the battery mounting member. The controller is configured to receive the position information, determine whether the engagement mechanism is fully engaged with the matching mechanism based on the position information, and send out alarm information in response to the engagement mechanism not being fully engaged with the matching mechanism.

Also in accordance with the disclosure, there is provided a battery safety alert method including detecting position information of an engagement mechanism provided at one of a battery and a battery mounting member. A matching mechanism is provided at another one of the battery and the battery mounting member, and the engagement mechanism is configured to engage with the matching mechanism to fix the battery to the battery mounting member. The method further includes determining whether the engagement mechanism is fully engaged with the matching mechanism based on the position information, and sending out alarm information in response to the engagement mechanism not being fully engaged with the matching mechanism.

Also in accordance with the disclosure, there is provided a battery including a casing and a battery safety alert system mounted in the casing. The battery safety alert system includes a detection device and a controller communicatively connected to the detection device. The detection device is configured to detect position information of an engagement mechanism provided at one of the battery and a battery mounting member. A matching mechanism is provided at another one of the battery and the battery mounting member. The engagement mechanism is configured to engage with the matching mechanism to fix the battery to the battery mounting member. The controller is configured to receive the position information, determine whether the engagement mechanism is fully engaged with the matching mechanism based on the position information, and send out alarm information in response to the engagement mechanism not being fully engaged with the matching mechanism.

REFERENCE NUMERALS

Figure 1:
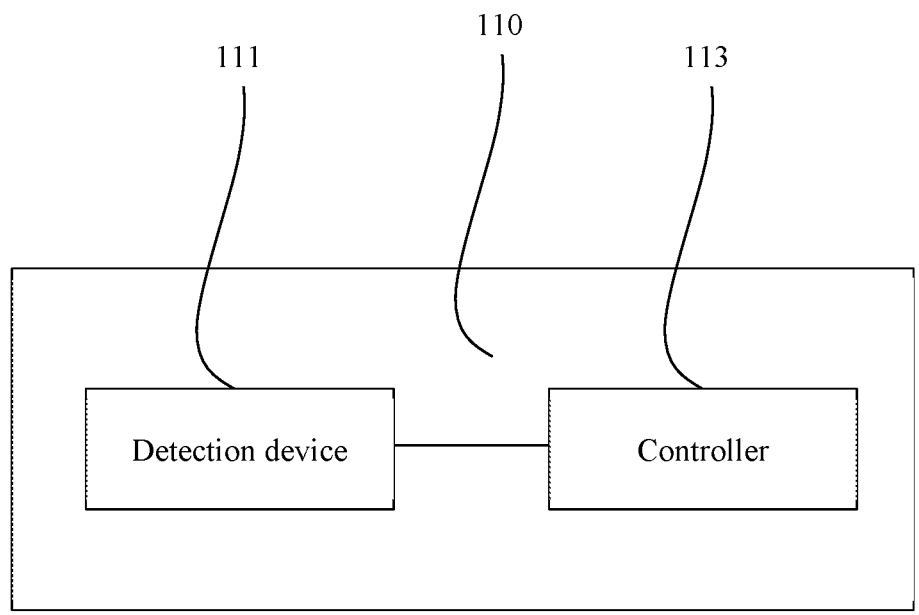
FIG. 1 is a schematic diagram of a battery safety alert system according to one embodiment of the present disclosure.

100—UAV
101—Battery
103—Battery mounting member
107—Battery casing
110—Battery safety alert system
111—Detection device
111a—Detection device
111b—Detection device
113—Controller
113a—Controller
113b—Controller
115—Alarm device
120—Engagement mechanism
130—Matching mechanism
200—UAV
201—Battery
203—Battery mounting member
211—Detection device
213—Controller
213a—Controller
213b—Controller
215—Alarm device
220—Engagement mechanism
230—Matching mechanism
300—Remote controller
400—Remote controller

DETAILED DESCRIPTION OF THE EMBODIMENTS

Technical solutions of the present disclosure will be described in detail with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, a mechanism being "fixed to" a second mechanism may include a direct contact of the first and second mechanisms, or may include no direct contact but a contact through other mechanisms in between. A mechanism being "connected to" a second mechanism may include a direct connection of the first and second mechanisms, or may include no direct connection but a connection through other mechanisms in between, or may include a direct integration of the two mechanisms. Terms of "vertical," "horizontal," "left," "right," etc., are only for illustrative purposes.

Unless otherwise defined, all technical and scientific terms have same meanings as commonly understood by those having ordinary skills in the art. Terms used in the specification of the present disclosure are only for descriptive purposes and are not intended to limit the present disclosure. A term of "and/or" includes any and all combinations of one or more related items described.

According to embodiments of the present disclosure, there is provided a battery safety alert system for detecting whether the battery is held securely in place. The battery safety alert system detects a status of fixation of the battery through a detection device. For example, one of the battery and a battery mounting member is provided with an engagement mechanism, and the other is provided with a matching mechanism. The engagement mechanism engages with the matching mechanism, so as to fix the battery to the battery mounting member.

The detection device can detect the status of fixation of the battery using one of various manners. For example, in some embodiments, the detection device may detect relative position information of the engagement mechanism and the matching mechanism, and determine whether the engagement mechanism is fully engaged with the matching mechanism according to the relative position information of the engagement mechanism and the matching mechanism, so as to ensure the battery is safely fixed to the battery mounting member. Specifically, the relative position information may be a relative separation distance between the engagement mechanism and the matching mechanism, or a staggered distance between the engagement mechanism and the matching mechanism, etc.

In some embodiments, the detection device may detect position information of the engagement mechanism, and determine whether the engagement mechanism is fully engaged with the matching mechanism according to the position information of the engagement mechanism, so as to ensure the battery is safely fixed to the battery mounting member. Specifically, the position information of the engagement mechanism can be a movement distance of the engagement mechanism, or a rotation angle of the engagement mechanism, etc.

In some embodiments, the detection device may detect relative position information of the battery and the battery mounting member, and determine whether the engagement mechanism is fully engaged with the matching mechanism according to the relative position information of the battery and the battery mounting member, so as to ensure the battery is safely fixed to the battery mounting member. Specifically, the relative position information may be a depth of the battery in the battery mounting member, or a sliding distance of the battery relative to the battery mounting member, etc.

The battery safety alert system can be provided at different devices. For example, the battery safety alert system can be provided at a battery, e.g., a smart battery, or it can be provided at a powered device, e.g., an unmanned aerial vehicle (UAV), a portable gimbal, or a remote controlling ground vehicle, or it can be provided at a charging device, e.g., a charger, or a battery management device, etc.

A prompt message generated by the battery safety alert system can be sent to a controller of the battery, a controller of the powered device, a controller of a remote control device of a powered device, or a processor of a charging device, so that the processors can perform a corresponding controlling operation.

In some embodiments, the prompt message generated by the battery safety alert system can be sent to a controller of a battery. The controller of the battery controls opening and closing of an electrical connection path or sends an alarm according to the prompt message. For example, when the battery safety alert system sends a prompt message that the battery is not securely fixed while the battery is supplying power, the controller of the battery can stop the power supply. When the battery safety alert system sends a prompt message that the battery is not securely fixed while the battery is being charged, the controller of the battery can stop the charging of the battery. When the battery safety alert system sends a prompt message that the battery is not securely fixed while the battery is being used (e.g., charging or discharging), the controller of the battery controls an alarm device to send an alarm, e.g., controlling an alarm light to emit light, controlling a speaker to emit an alarm sound, or controlling a vibrator to vibrate.

In some embodiments, the prompt message generated by the battery safety alert system can be sent to a controller of a powered device. The controller of the powered device controls a powered circuit to be disconnected, controls a power device to perform a corresponding operation, or sends an alarm according to the prompt message. For example, if a UAV is on a ground and has not taken off, and the battery safety alert system sends a prompt message that the battery is not securely fixed, the controller of the UAV can control a power system to forbit taking off, control the alarm device to send an alarm, or send the prompt message to the remote controller of the UAV. During a flight of the UAV, when the battery safety alert system sends a prompt message that the battery is not securely fixed, the controller of the UAV can control the alarm device to send an alarm or send the prompt message to the remote controller of the UAV.

In some embodiments, the prompt message generated by the battery safety alert system can be sent to a controller of a remote control device of a powered device. The controller of the remote control device generates information with controlling options to a user or sends an alarm according to the prompt message. For example, during a flight of the UAV, when the battery safety alert system sends a prompt message that the battery is not securely fixed, the controller of the remote control of the UAV can control the alarm device to send an alarm or generate control information of whether to land immediately to the user, and the user can choose whether to control the UAV to land immediately.

Embodiments of the present disclosure are described in detail below with reference to the drawings, which are only for illustrative purposes and should not be construed as limiting the present disclosure.

FIG. 1 shows a battery safety alert system 110 consistent with the disclosure. The battery safety alert system 110 includes a detection device 111 and a controller 113. The detection device 111 is communicatively connected to the controller 113, e.g., in a wired communication connection or a wireless communication connection.

Figure 2A:
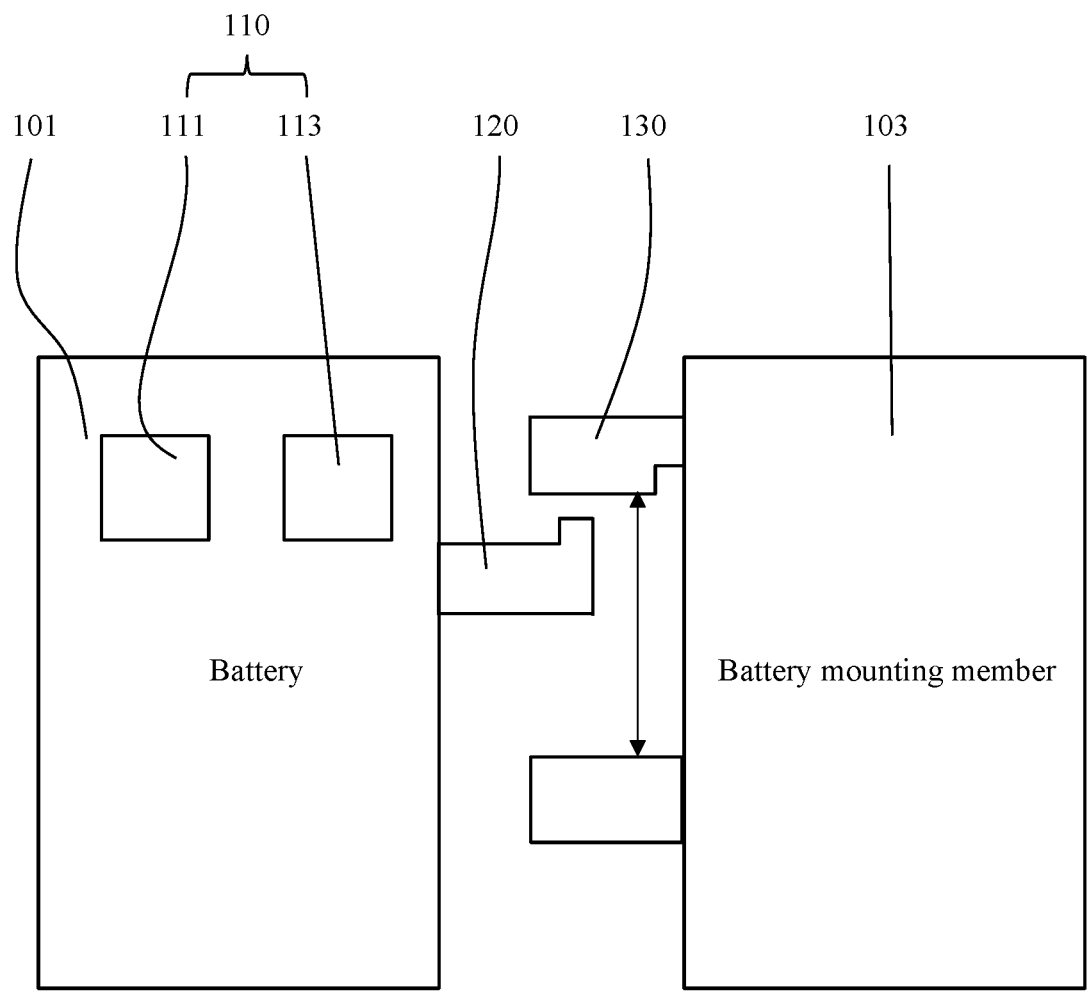
FIG. 2A is a schematic diagram showing a sliding movement of an engagement mechanism relative to a matching mechanism of a battery detection system according to one embodiment of the present disclosure.

As shown in FIG. 2A, an engagement mechanism 120 engages with a matching mechanism 130 to fix a battery 101 to a battery mounting member 103. The battery safety alert system 110 is configured to detect whether the engagement mechanism 120 is fully engaged with the matching mechanism 130.

The detection device 111 can detect various movement information of the engagement mechanism. For example, in some embodiments, the detection device 111 may be a displacement detection device for detecting a movement distance of the engagement mechanism 120. In some other embodiments, the detection device 111 may be an angle detection device for detecting a rotation angle of the engagement mechanism 120.

The detection device 111 can adopt various types according to different needs. For example, in some embodiments, the detection device 111 detects position information of the engagement mechanism 120 by using a principle of a magnetoelectric effect, and the corresponding detection device 111 may be a Hall sensor, also referred to as a Hall detection device. In some embodiments, the detection device 111 detects position information of the engagement mechanism 120 by using a principle of a photoelectric effect, and the corresponding detection device 111 may be a photoelectric sensor, also referred to as a photoelectric detection device. In some embodiments, the detection device 111 may be a micro switch.

Figure 7:
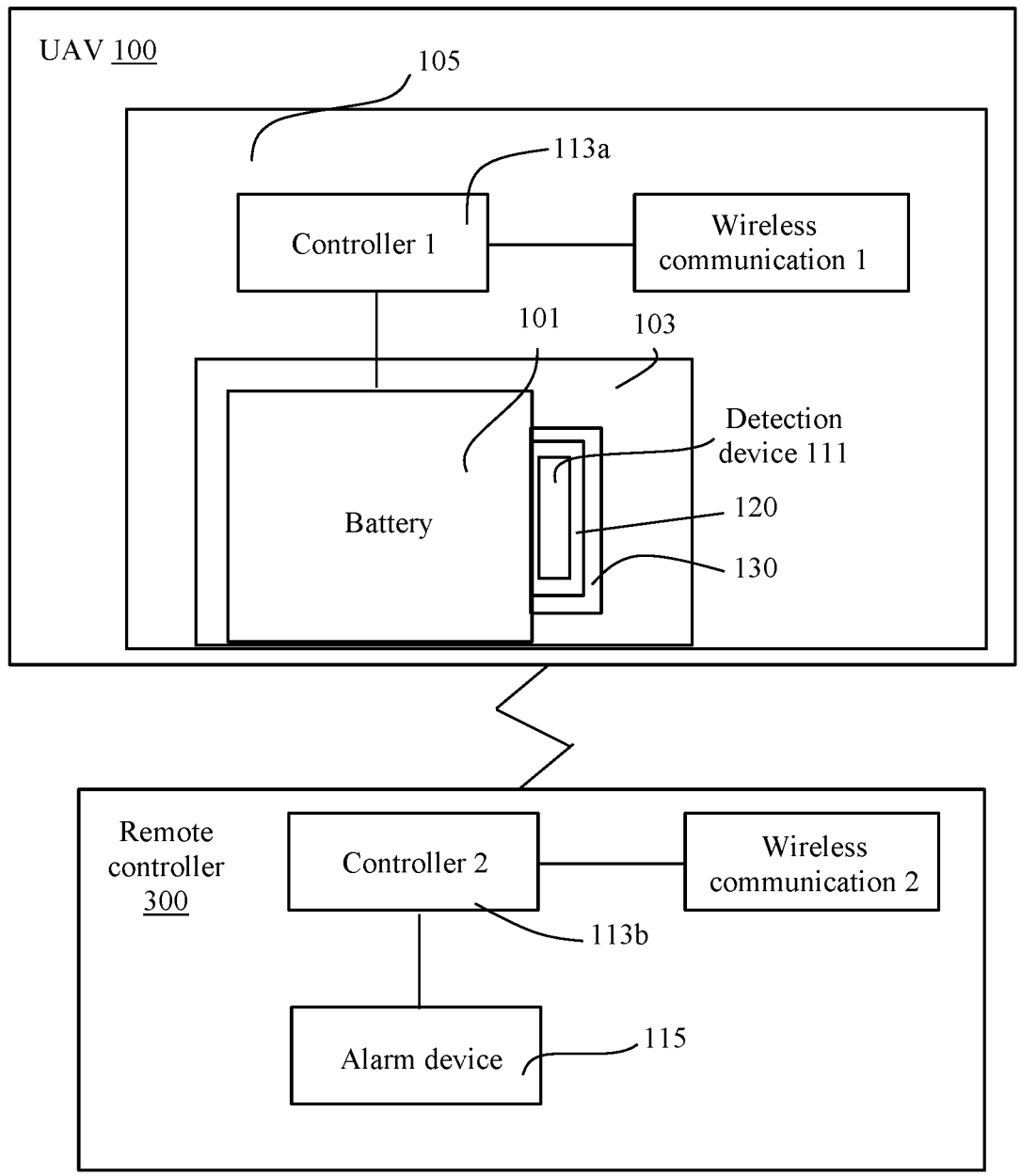
FIG. 7 is a diagram showing an operation principle of a UAV according to one embodiment of the present disclosure.

A position of the controller 113 can be set according to different needs. For example, in some embodiments, the controller 113 and the detection device 111 can be both provided at the battery 101. In some embodiments, the controller 113 and the detection device 111 can be both provided at the battery mounting member 103. In some embodiments, as shown in FIG. 7, the controller 113 is provided at both of the battery 101 and a remote controller 300, or the controller 113 is provided at both of the battery mounting member 103 and the remote controller 300.

The controller 113 is communicatively connected to the detection device 111 for receiving the position information of the engagement mechanism 120 detected by the detection device 111. The communicative connection can be wired or wireless.

The engagement mechanism 120 is movable relative to the matching mechanism. For example, as shown in FIG. 2A, the engagement mechanism 120 is slidable relative to the matching mechanism 130. Correspondingly, the detection device 111 is a displacement detection device that detects a movement distance as the position information of the engagement mechanism 120.

Figure 2B:
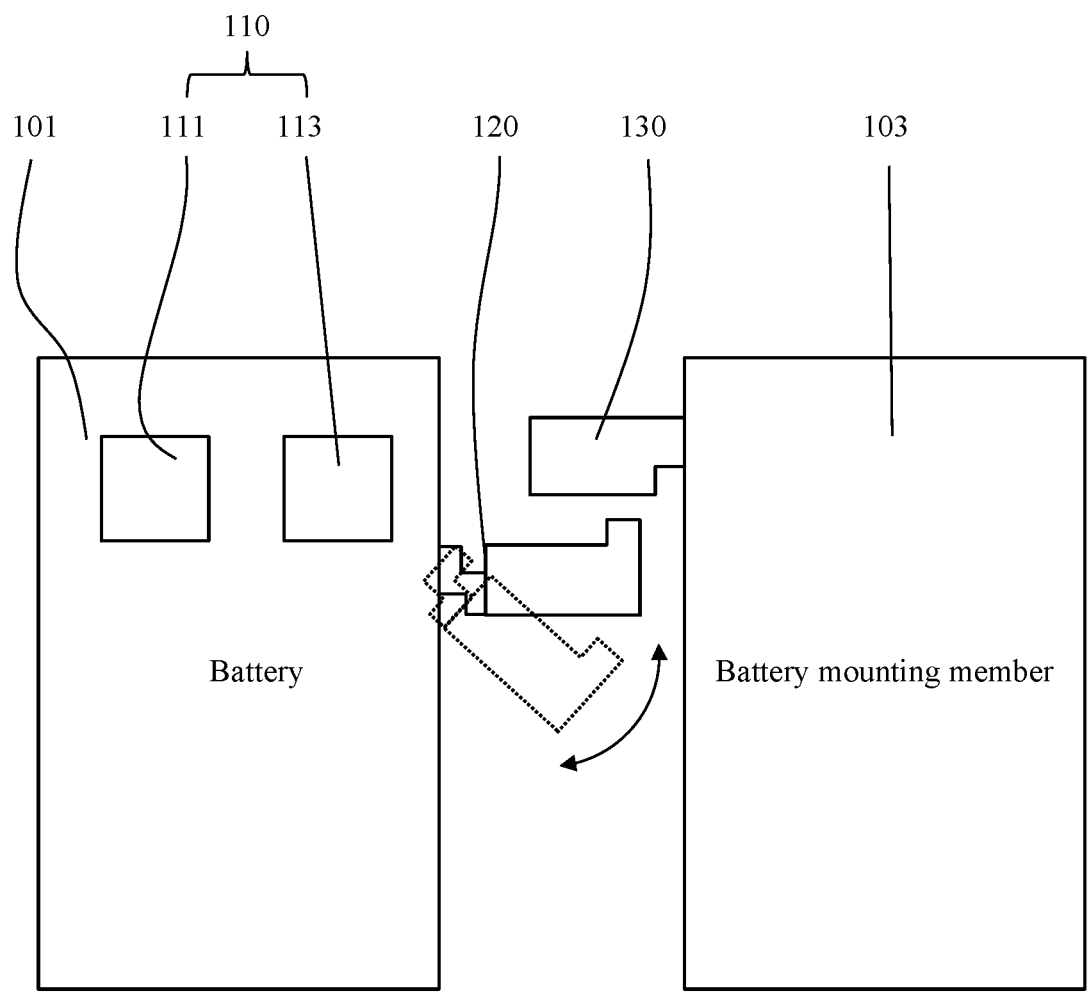
FIG. 2B is a schematic diagram showing a rotation movement of an engagement mechanism relative to a matching mechanism of a battery detection system according to one embodiment of the present disclosure.

In another embodiment, as shown in FIG. 2B, the engagement mechanism 120 is rotatable relative to the matching mechanism 130. Correspondingly, the detection device 111 is an angle detection device that detects a rotation angle as the position information of the engagement mechanism 120.

Figure 2C:
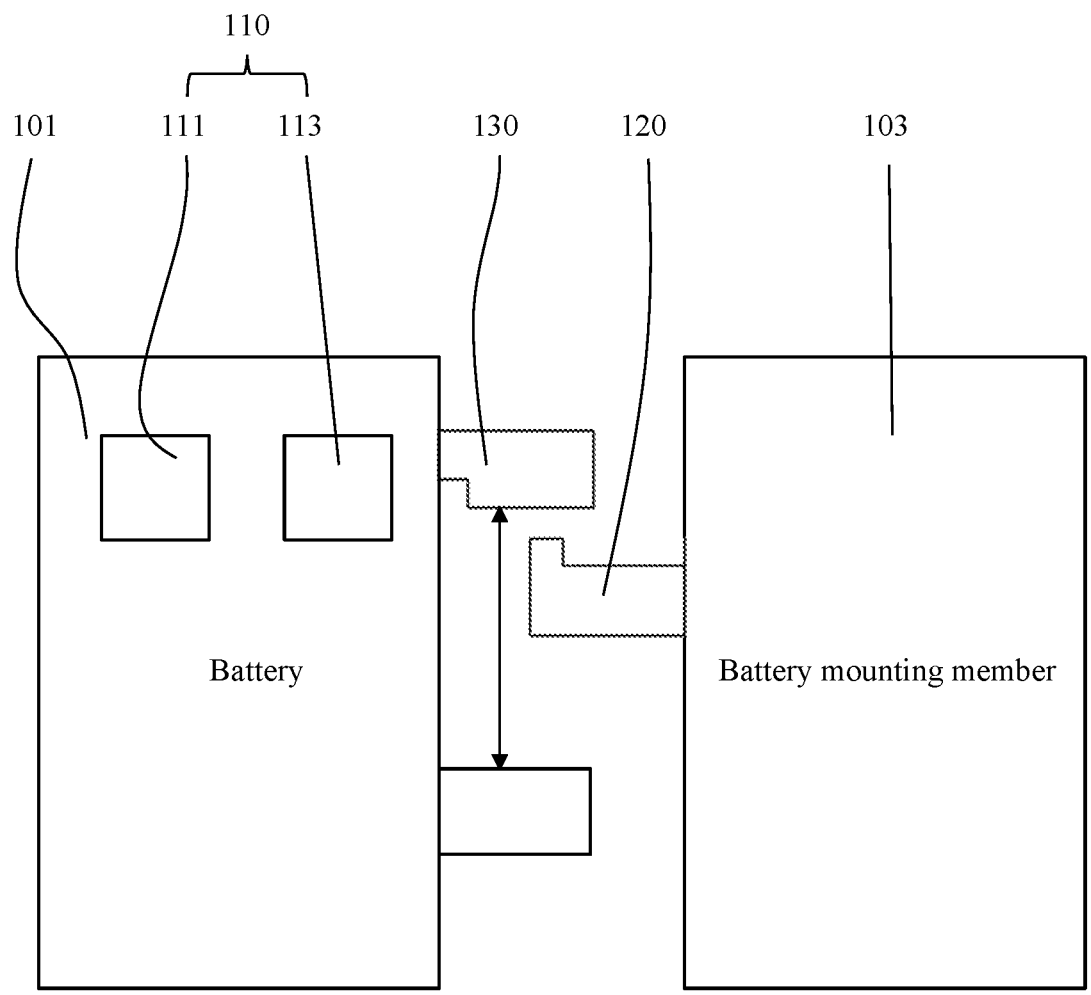
FIG. 2C is a schematic diagram showing a sliding movement of an engagement mechanism relative to a matching mechanism of a battery detection system according to another embodiment of the present disclosure.

Positions of the engagement mechanism 120 and the matching mechanism 130 can be determined according to different needs. For example, as shown in FIG. 2A FIGS. 2A and 2B, the engagement mechanism 120 is provided at the battery 101, and the matching mechanism 130 is provided at the battery mounting member 103. In FIG. 2C, the engagement mechanism 120 is provided at the battery mounting member 103, and the matching mechanism 130 is provided at the battery 101.

Specific structures of the engagement mechanism 120 and the matching mechanism 130 can be determined according to different needs. For example, as shown in FIG. 2A, the matching mechanism 130 is provided with a slot, and the engagement mechanism 120 is provided with a hook that engages with the slot. The hook at the engagement mechanism 120 can slide into the slot to engage with the slot, or slide out to separate from the slot. In FIG. 2A, the matching mechanism 130 is provided with a first hook, and the engagement mechanism 120 is provided with a second hook that engages with the first hook. The second hook at the engagement mechanism 120 can slide relative to the first hook to engage with or separate from the first hook. The engagement mechanism 120 is engaged with the matching mechanism 130 to fix the battery 101 to the battery mounting member 103. When the engagement mechanism 120 is separated from the matching mechanism 130, the battery 101 can be freely separated from the battery mounting member 103.

A position of the detection device 111 can be set according to different needs. For example, in some embodiments, the detection device 111 can be provided at the engagement mechanism 120. In some embodiments, the detection device 111 can be provided at the matching mechanism 130. The following examples illustrate methods for detecting the movement information of the engagement mechanism 120 when the detection device 111 is provided at different positions.

In some embodiments, the detection device is provided at the engagement mechanism. With reference to FIG. 2A, when the detection device 111 detects the movement distance of the engagement mechanism 120, the detection method of the detection device 111 can be determined according to different needs. For example, as shown in FIG. 2A, the detection device 111 is provided at the hook, and a value for the movement distance is preset. When the movement distance of the engagement mechanism 120 detected by the detection device 111 is greater than the preset value, it may indicate that the engagement is in place. When the movement distance of the engagement mechanism 120 detected by the detection device 111 is smaller than or equal to the preset value, it may indicate that the engagement is not in place. The controller then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

In some embodiments, the detection device 111 is still provided at the hook, and a value for the movement distance is preset. When the movement distance of the engagement mechanism 120 detected by the detection device 111 is smaller than the preset value, it may indicate that the engagement is in place. When the movement distance of the engagement mechanism 120 detected by the detection device 111 is greater than or equal to the preset value, it may indicate that the engagement is not in place. The controller then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

With reference to FIG. 2B, when the detection device 111 detects the rotation angle of the engagement mechanism 120, the detection method of the detection device 111 can be determined according to different needs. For example, in some embodiments, the detection device 111 can be provided at the engagement mechanism 120 that can rotate at an angle relative to the matching mechanism 130. The corresponding detection device 111 may be an angle detection device that detects the rotation angle as the position information of the engagement mechanism 120. The engagement mechanism 120 can be provided at the battery 101, and the matching mechanism 130 can be provided at the battery mounting member 103. Or the engagement mechanism 120 can be provided at the battery mounting member 103, and the matching mechanism 130 can be provided at the battery 101. When the angle between the engagement mechanism 120 and the matching mechanism 130 is smaller than a preset value, it can indicate the engagement is in place. When the angle between the engagement mechanism 120 and the matching mechanism 130 is greater than the preset value, it can indicate the engagement mechanism is separated from the matching mechanism. The controller 113 is communicatively connected to the detection device 111 for receiving the position information of the engagement mechanism 120 detected by the detection device 111.

A specific connection method of the detection device 111 and the engagement mechanism 120 can be determined according to different needs. For example, in some embodiments, the detection device 111 is connected to a rotation shaft of the hook of the engagement mechanism 120, and the detection device may be an angle encoder. The matching mechanism 130 is provided with a slot or a buckle. Two rotation angle values, a first preset angle and a second preset angle, can be preset for the detection device 111. In some embodiments, the detection device 111 can be fixed at the engagement mechanism 120 and the matching mechanism 130. The detection device 111 includes a magnet provided at a free end of the hook and a Hall sensor provided at the matching mechanism.

The hook can rotate between a position corresponding to the first preset angle and a position corresponding to the second preset angle around the rotation shaft. When the hook rotates to the potion corresponding to the first preset angle, the hook engages with the slot or the buckle, indicating that the engagement is in place. When the hook rotates to the potion corresponding to the second preset angle, the hook is separated from the slot or the buckle, indicating that the engagement is not in place. The controller 113 then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

In some embodiments, the detection device 111 is provided at the matching mechanism 130. When the detection device 111 detects the movement distance of the engagement mechanism 120, the detection method of the detection device 111 can be determined according to different needs. For example, in some embodiments, the detection device 111 may be provided at a bottom of the slot or near the slot, and a value for the movement distance is preset. When the movement distance of the engagement mechanism 120 relative to the matching mechanism 130 detected by the detection device 111 is smaller than the preset value, it may indicate that the engagement is in place. When the movement distance of the engagement mechanism 120 relative to the matching mechanism 130 detected by the detection device 111 is greater than or equal to the preset value, it may indicate that the engagement is not in place. The controller then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

In some embodiments, the detection device 111 is still provided at the bottom of the slot or near the slot, and a value for the movement distance is preset. When the movement distance of the engagement mechanism 120 relative to the matching mechanism 130 detected by the detection device 111 is greater than the preset value, it may indicate that the engagement is in place. When the movement distance of the engagement mechanism 120 relative to the matching mechanism 130 detected by the detection device 111 is smaller than or equal to the preset value, it may indicate that the engagement is not in place. The controller then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

When the detection device 111 is provided at the matching mechanism 130 and detects the rotation angle of the engagement mechanism 120, the position information of the engagement mechanism 120 detected by the angle detection device 111 is a rotation angle of the engagement mechanism 120 relative to the matching mechanism 130. The matching mechanism 130 may be provided with a slot, and the detection device 111 may be provided at a bottom of the slot or at an edge of the slot. Two rotation angle values, a first preset angle and a second preset angle, can be preset for the detection device 111. The hook can rotate between a position corresponding to the first preset angle and a position corresponding to the second preset angle around a rotation shaft. When the hook rotates to the potion corresponding to the first preset angle, the hook engages with the slot, indicating that the engagement is in place. When the hook rotates to the potion corresponding to the second preset angle, the hook is separated from the slot, indicating that the engagement is not in place. The controller 113 then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

In some embodiments, the matching mechanism 130 is provided with a buckle and the detection device 111 can be provided at the buckle. Two rotation angle values can be preset as a first preset angle and a second preset angle. The hook can rotate between a position corresponding to the first preset angle and a position corresponding to the second preset angle around a rotation shaft. When the hook rotates to the potion corresponding to the first preset angle, the hook engages with the buckle, indicating that the engagement is in place. When the hook rotates to the potion corresponding to the second preset angle, the hook is separated from the buckle, indicating that the engagement is not in place. The controller 113 then sends a corresponding prompt message indicating that the battery 101 is not fully mounted at the battery mounting member 103 to prompt a user to re-check and re-mount the battery 101, thereby ensuring that the connection between the battery 101 and the battery mounting member 103 is safe and reliable. In some embodiments, when the engagement mechanism 120 is fully engaged with the matching mechanism 130, the controller 113 may also send a prompt message indicating that the engagement is in place, to prompt the user that the battery 101 is mounted reliably and can be used with confidence.

Figure 3:
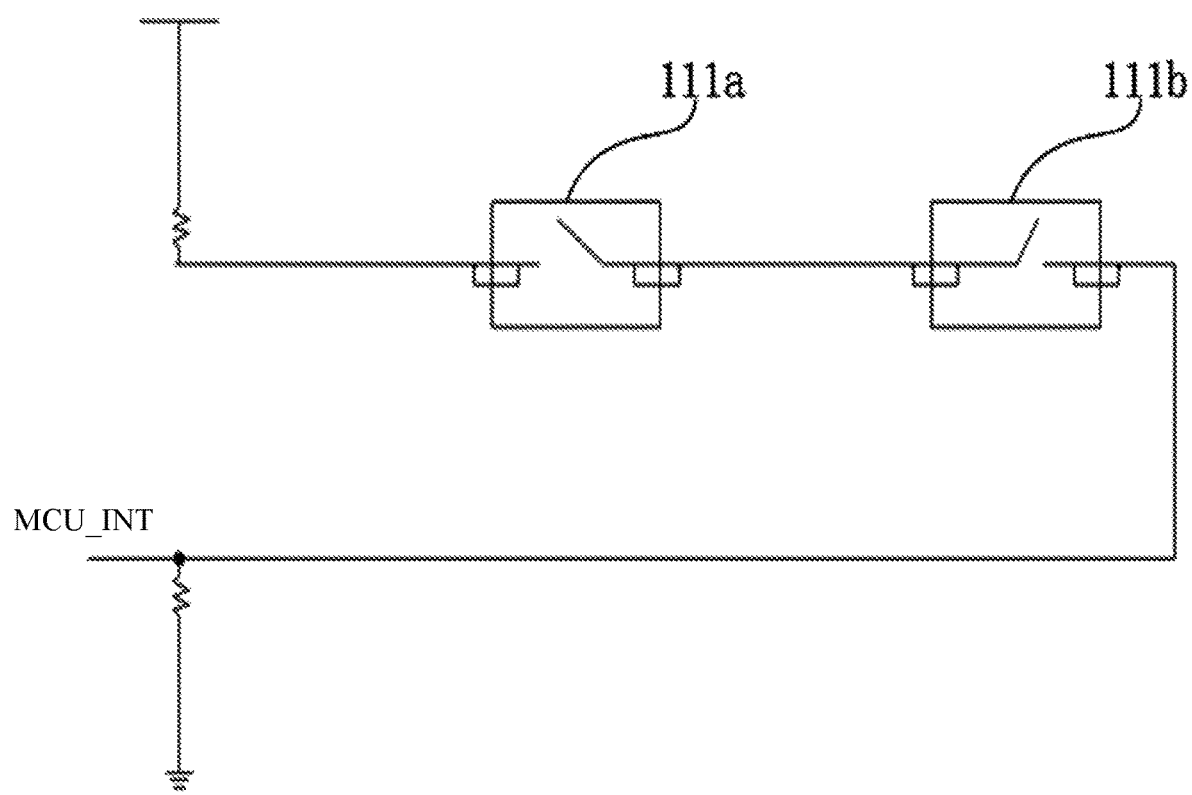
FIG. 3 is a schematic circuit diagram of a detection device of the battery safety alert system according to one embodiment of the present disclosure.

The battery safety alert system 110 can detect an engagement of one engagement mechanism 120 with the matching mechanism 130, and can also detect engagement of a plurality of engagement mechanism 120 with the matching mechanism 130 simultaneously. With reference to a schematic diagram in FIG. 3, a circuit structure is provided with two detection devices 111*a* and 111*b*, including two micro switches 111*a* and 111*b*. The two micro switches 111*a* and 111*b* are connected in series in the circuit and are communicatively connected to the controller 113, where the communicative connection can be wired or wireless.

The two micro switches 111*a* and 111*b* are respectively triggered by the two engagement mechanisms 120. Only when the two micro switches 111*a* and 111*b* are triggered simultaneously will the circuit link formed by the two micro switches 111*a* and 111*b* be turned on, indicating that the two engagement mechanisms 120 are fully engaged simultaneously and the battery is in a relatively stable status.

In some embodiments, the battery safety alert system 110 may further include an alarm device communicatively connected to the controller 113. The alarm device is configured to prompt a user whether the battery is mounted reliably and can be used safely.

An alarm form of the alarm device may include at least one of an image display, a sound prompt, a light-emitting display, a vibration prompt, etc. Correspondingly, the alarm device may include at least one of a display screen, a speaker, a light, or a vibrator.

A position of the alarm device can be set according to different needs. For example, the alarm device may be provided at the battery, at the powered device or the charging device, etc., or at the remote control device of the powered device.

Based on the above described battery safety alert system, the present disclosure also provides an unmanned aerial vehicle (UAV) with the battery safety alert system, which is described below with reference to the drawings.

Figure 4A:
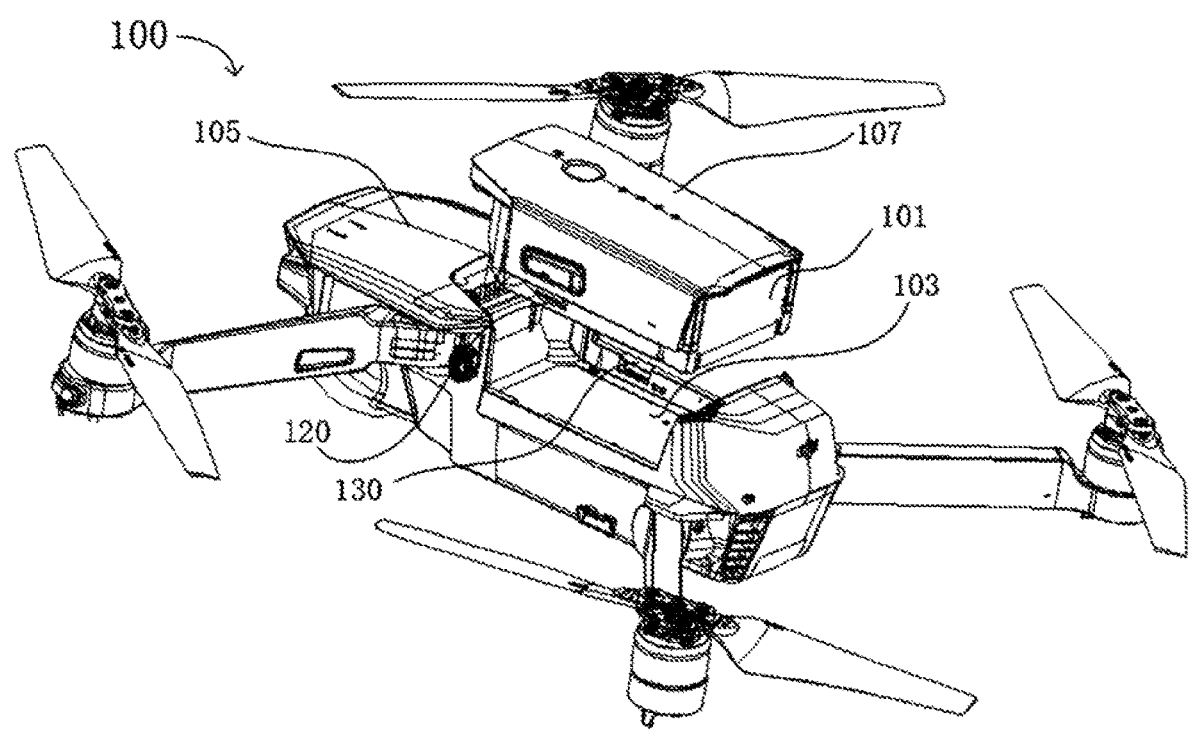
FIG. 4A is a schematic diagram of a three-dimensional structure of an unmanned aerial vehicle according to one embodiment of the present disclosure.
Figure 4B:
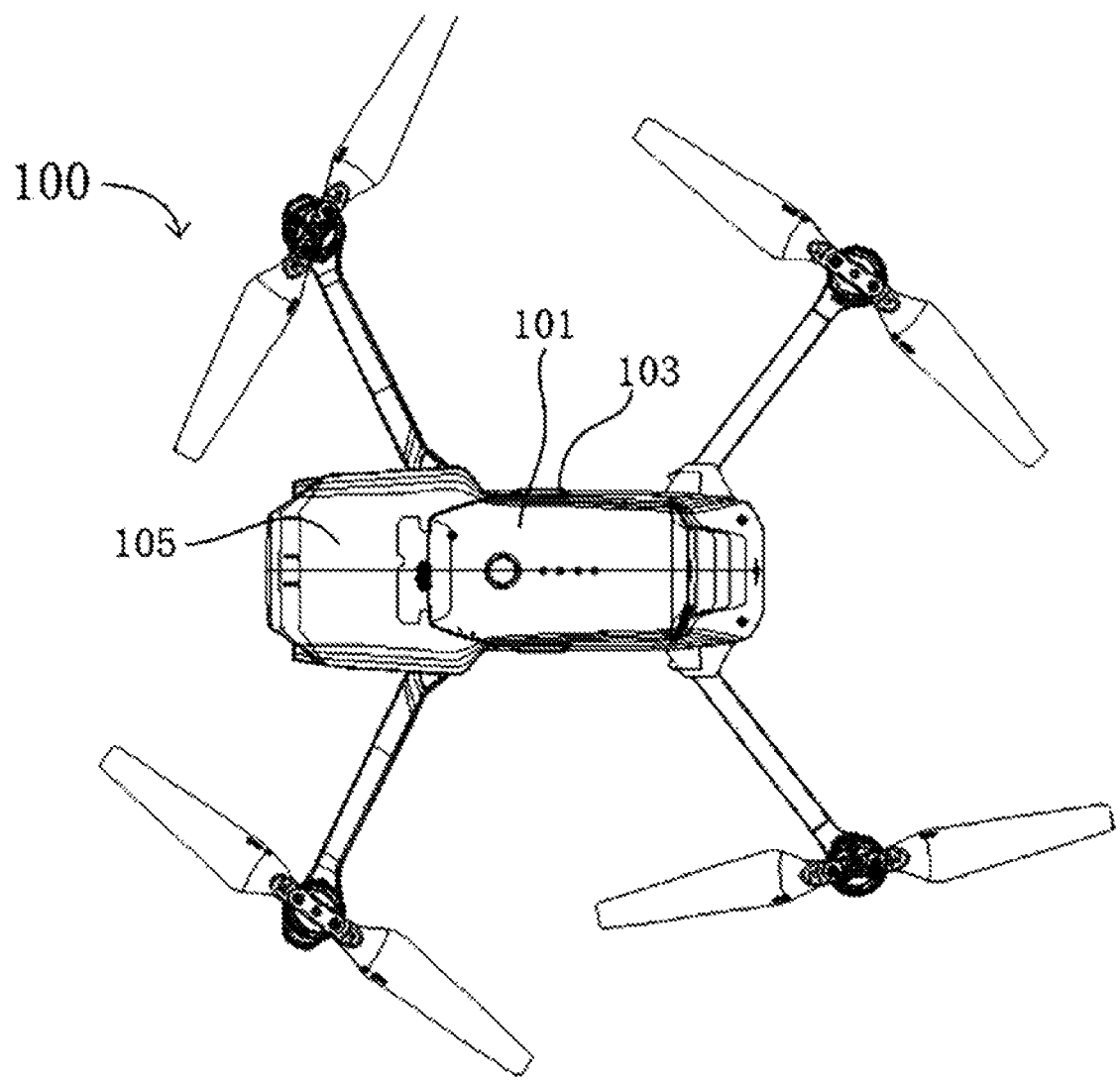
FIG. 4B is a schematic diagram of a three-dimensional structure of an unmanned aerial vehicle (UAV) from another perspective according to one embodiment of the present disclosure.

FIGS. 4A and 4B show a UAV 100 consistent with the disclosure. The UAV 100 includes a body 105, a battery 101, a battery mounting member 103, a battery casing 107, an engagement mechanism 120, a matching mechanism 130, and the battery safety alert system 110 described in above embodiments (not shown in the figure).

The battery 101 further includes a battery casing 107 for protecting the battery 101. The battery casing 107 is provided outside the battery 101 and can wrap the battery 101 therein.

The battery mounting member 103 is provided in the body 105, and the battery 101 can be mounted at the battery mounting member 103.

The engagement mechanism 120 may be provided at the battery 101 or at the battery mounting member 103. Correspondingly, the matching mechanism 130 may be provided at the battery mounting member 103 or at the battery 101.

FIG. 4A shows a status where the battery 101 and the battery mounting member 103 of the UAV 100 including the battery safety alert system 110 are separated. In this status, the UAV 100 cannot perform normal flight. FIG. 4B shows a status where the battery 101 and the battery mounting member 103 of the UAV 100 including the battery safety alert system 110 are fully fixed. In this status, the UAV 100 can perform normal flight.

Figure 5:
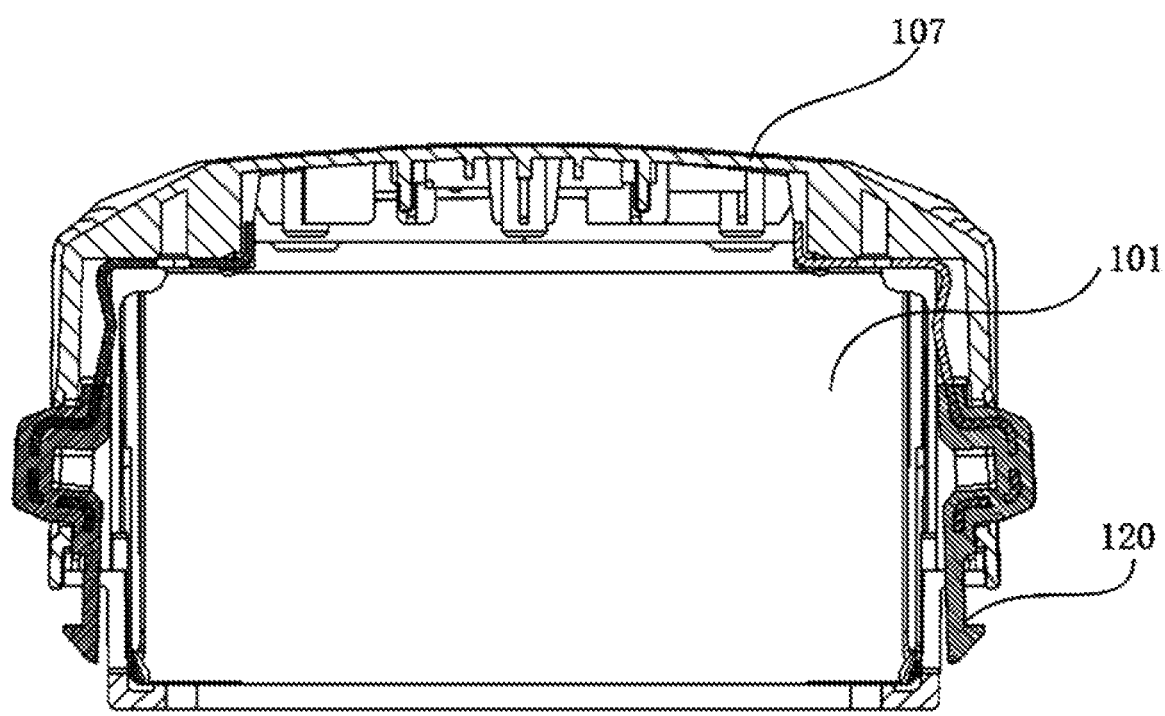
FIG. 5 is a cross-sectional diagram of the structure of a battery of the UAV in FIGS. 4A and 4B.

FIG. 5 shows a cross-sectional view of the battery 101 of the UAV 100. The battery 101 is configured to supply power to the UAV 100. The engagement mechanism 120 is provided at the battery 101, and is symmetrically arranged on the left and right sides of the battery.

Figure 6:
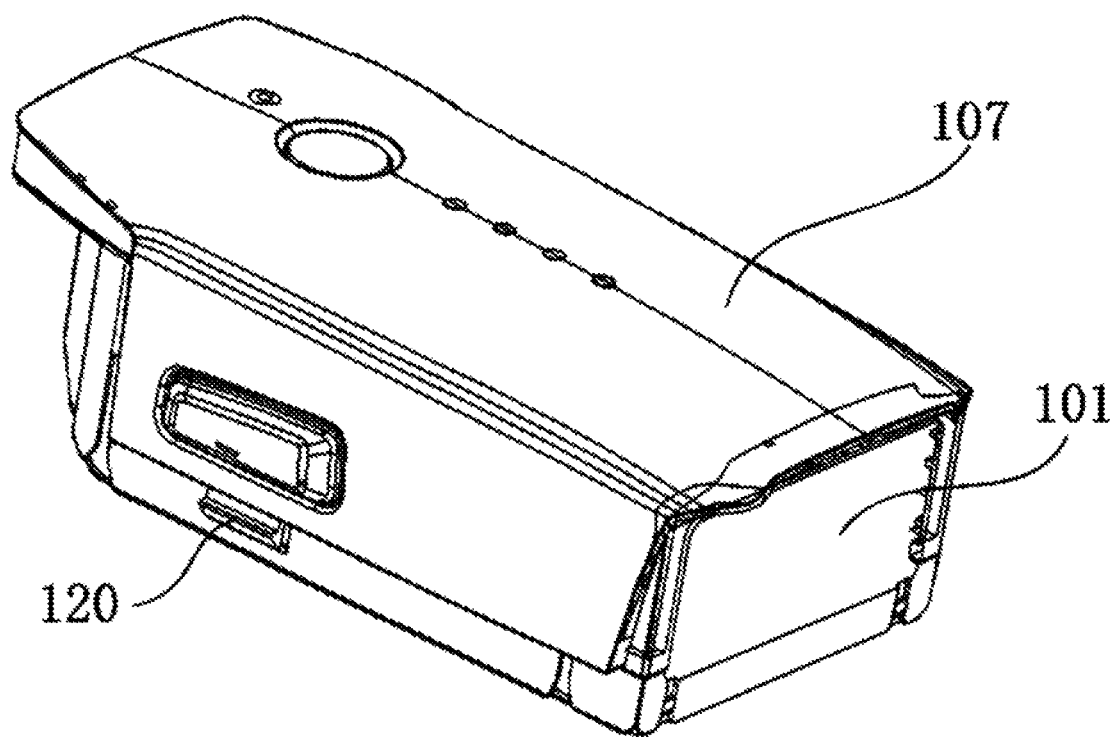
FIG. 6 is a schematic diagram of a three-dimension structure of the battery of the UAV in FIGS. 4A and 4B.

FIG. 6 shows a three-dimensional view of the battery 101, where the battery casing 107 is provided around the battery 101 to protect the battery 101. The engagement mechanism 120 is symmetrically arranged on the left and right sides of the battery.

In some embodiments, with reference to FIG. 4A, the UAV 100 includes above-described battery safety alert system 110, the battery 101, the battery mounting member 103, the body 105, the battery casing 107, the engagement mechanism 120, and the matching mechanism 130.

In some embodiments, the battery mounting member 103 is provided at the body 105. The engagement mechanism 120 is slidable relative to the matching mechanism 130. The matching mechanism 130 is symmetrically arranged on both sides of the battery mounting member 103, and the engagement mechanism 120 is also symmetrically arranged on the left and right sides of the battery 101.

The matching mechanism 130 is provided with a slot. The engagement mechanism 120 includes a hook configured to engage with the slot of the matching mechanism 130. The hook at the engagement mechanism 120 can slide into the slot to engage with the slot, or slide out to separate from the slot. The detection device 111 also includes two that are symmetrically provided at the hooks of the engagement mechanism 120 on both sides of the battery 101. In some embodiments, the engagement mechanism 120 is slidable relative to the matching mechanism 130, and the corresponding detection devices 111*a* and 111*b* are both displacement detection device. Specifically, the displacement detection devices 111*a* and 111*b* are micro switches that are arranged on both sides of the battery 101 and connected in series in the circuit.

In some embodiments, the position information of the engagement mechanism 120 is detected by the micro switches. Specifically, the position information is the detected moving distance of the engagement mechanism 120 on the both sides of the battery 101. The micro switches 111*a* and 111*b* are in series in the circuit and are respectively triggered by the two engagement mechanism 120. If one micro switch is off, it is indicated one corresponding engagement mechanism 120 is not fully engaged, in which case the battery safety alert system 110 prompts that the connection of the battery 101 is not reliable and requires the user to recheck and mount the battery 101.

In some embodiments, the two micro switches connected in series are normally closed switches. If the hooks of the engagement mechanisms 120 on both sides do not trigger the micro switches, it is indicated that the engagement mechanism 120 and the matching mechanism 130 on both sides are fully engaged, in which case an MCU_INT detection is a high level, prompting the user that the battery 101 is connected reliably and a taking off or other operation of the UAV can be performed. When the hook on one side slides and triggers the corresponding micro switch, causing the corresponding micro switch to turn off, it is indicated that the engagement mechanism 120 and the matching mechanism 130 on that one side are not fully engaged, in which case the MCU_INT detection is a low level. The controller 113 then sends a corresponding prompt message indicating that the connection of the battery 101 is not reliable and needs a recheck. Similarly, when the hook on the other side slides and triggers the corresponding micro switch, causing the corresponding micro switch to turn off, it is indicated that the engagement mechanism 120 and the matching mechanism 130 on that other side are not fully engaged, in which case the MCU_INT detection is also the low level. The controller 113 also sends a corresponding prompt message indicating that the battery 101 is not securely mounted or connected reliably. If the micro switches are triggered and turned off on both sides, MCU_INT is also low level, and the controller 113 also sends a corresponding prompt message to prompt the user to check the connection of the battery 101.

In some embodiments, the micro switch is used to detect the movement distance of the engagement mechanism 120 to ensure that the hook of the engagement mechanism 120 moves within a preset movement distance, thereby ensuring that the battery 101 and the battery mounting member 103 are tightly engaged. If it is detected that the movement distance of the hook exceeds the preset distance, the safety alert system 110 prompts the user to engage the battery 101 into place. Further, if the battery is not fully mounted before a taking off, a function of the UAV 100 can be restricted through a program setting, e.g., not being able to operate the UAV 100 to take off when the battery is not fully mounted.

In some embodiments, as shown in FIG. 7, a remote controller 300 is provided. In some embodiments, the remote controller 300 can be provided as part of the UAV 100. In some embodiments, as shown in FIG. 7, the remote controller 300 includes a controller 113*b* and an alarm device 115. The remote controller 300 is wireless communicatively connected to the UAV 100. The controller 113*b* is wireless communicatively connected to the detection device 111 to receive a signal from the detection device 111, and can send corresponding control information.

In some embodiments, as shown in FIG. 7, the alarm device 115 is provided at the remote controller 300. In some other embodiments, the alarm device 115 can be provided at the body 105 of the UAV 100. The alarm device 115 is configured to prompt the user whether the battery is mounted reliably, so as to achieve a goal of using the battery safely. An alarm form of the alarm device may include at least one of an image display, a sound prompt, a light-emitting display, a vibration prompt, etc. Correspondingly, the alarm device may include at least one of a display screen, a speaker, a lamp or a vibrator.

As shown in FIG. 7, the detection device is provided at the engagement mechanism 120. There are two controllers 113 (controller 1 denoted by 113*a* in the figure and controller 2 denoted by 113*b* in the figure) arranged at the body 105 and the remote controller 300, respectively. The detection device 111 and the controller 113*a* provided at the body 105 may be wiredly or wirelessly connected. The detection device 111 and the controller 113*b* provided at the remote controller 300 may be wirelessly connected.

Figure 8:
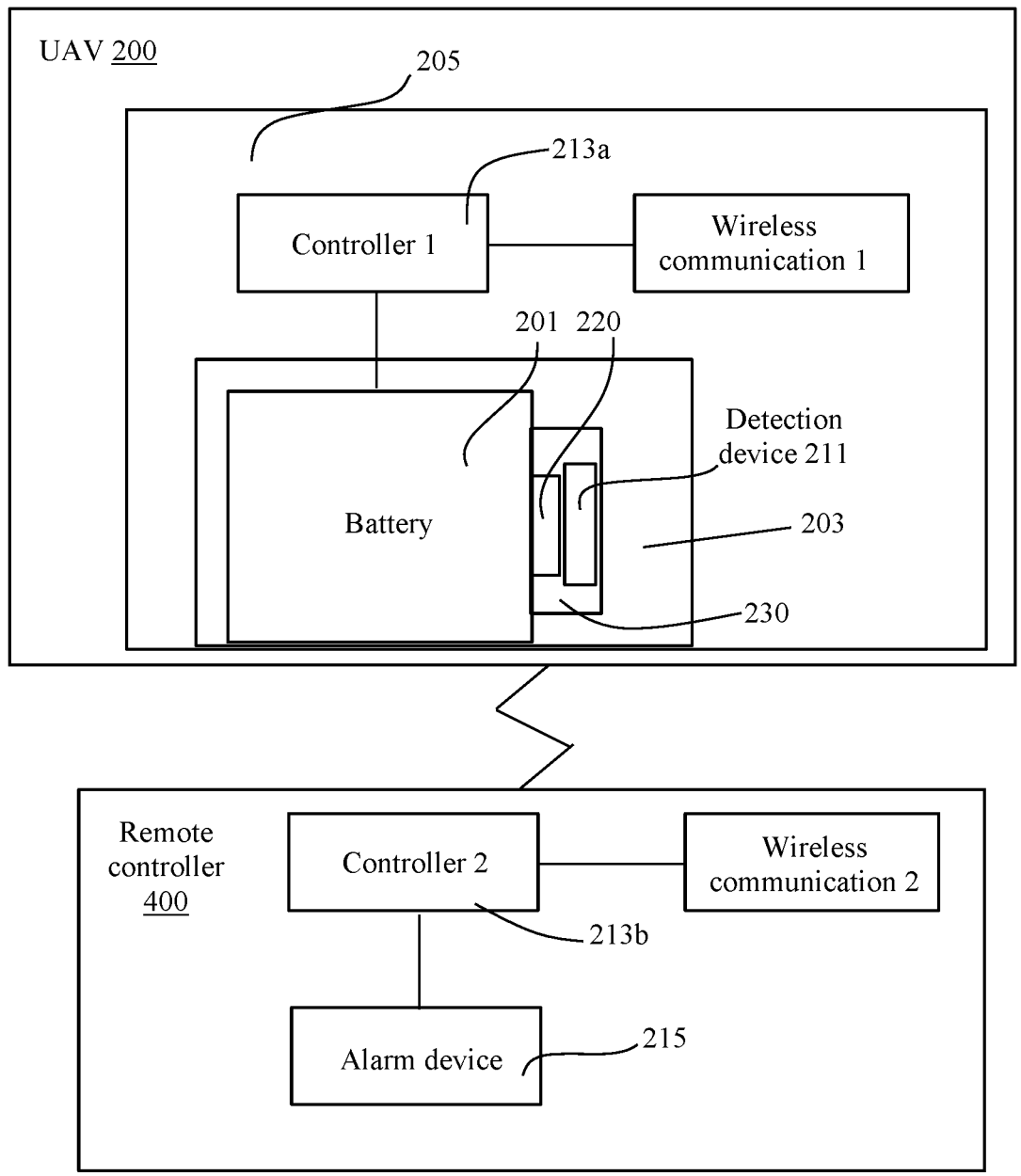
FIG. 8 is a diagram showing another mode of an operation principle of a UAV according to one embodiment of the present disclosure.

In some embodiments, as shown in FIG. 8, a UAV 200 includes a body 205, a battery safety alert system 210, a battery 201, a battery mounting member 203, an engagement mechanism 220, a matching mechanism 230, an alarm device 215, and a remote controller 400. A detection device is provided at the matching mechanism 230. Two controllers 213 (controller 1 denoted by 213a in the figure and controller 2 denoted by 213b in the figure) are respectively provided at the body 205 and the remote controller 400. The detection device 211 and the controller 213a provided at the body 205 may be wired or wirelessly connected. The detection device 211 and the controller 213b provided at the remote controller 400 may be wirelessly connected. The alarm device 215 is configured to warn that the battery is not fully mounted and serves as a prompt. The alarm device 215 may be provided at the remote controller 400 or at the body 205 of the UAV 200.

In some embodiments, the form of the alarm is image display, and the corresponding alarm device 115 is a display screen provided at the remote controller 300. If the detection device 111 detects that the engagement mechanism 120 is not fully engaged with the matching mechanism 130, the display screen of the alarm device 115 displays an image to prompt the user that the battery 101 is not fully mounted.

In some embodiments, the form of the alarm is a combination of image display and light emission, and the corresponding alarm device 115 includes a display screen provided at the remote controller 300 and a light provided at the body 105. If the detection device 111 detects that the engagement mechanism 120 is not fully engaged with the matching mechanism 130, the display screen provided at the remote controller 300 displays an image, and the light provided at the body 105 emits light. The two alarm devices operate simultaneously, and the user can be prompted that the battery 101 is not fully mounted by receiving any alarm message.

In some embodiments, the form of the alarm is a combination of light emission and vibration, and the corresponding alarm device 115 includes a light and a vibrator both provided at the body 105. If the detection device 111 detects that the engagement mechanism 120 is not fully engaged with the matching mechanism 130, the light and the vibrator provided at the body 105 operate simultaneously. Either by eye observing or touching the UAV 100, the user can receive an alarm message to know that the battery 101 is not fully mounted.

Since the above-described UAV 100 includes the battery safety alert system 100, before taking off, it can prompt the user whether the battery 101 is mounted reliably through the battery safety alert system. During the flight of the UAV 100, if the battery 101 is loose, the battery safety alert system can also warn the user in time. The present disclosure can greatly improve the reliability of a battery system of the UAV 100 and the reliability of the connection of the battery 101. A user does not need to worry about a vibration and coming off of the battery 101 due to not fully mounted after the UAV takes off, or the battery 101 becomes loose due to a vibration of the UAV 100 and cannot be found in time. Before the UAV 100 takes off or during flight, the battery safety alert system 110 can always send safety prompt message when the battery 101 is loose. If the safety prompt message appears during the flight of the UAV 100, the user can safely land the UAV 100 by a manual operation, etc., and check the mounting status of the battery 101 in time after landing. This can effectively reduce an accident rate of the UAV 100, reduce a crash or bomber caused by the loose of the battery, and effectively avoid a loss.

The terms of "some embodiments," "an embodiment," "one embodiment," or "example" mentioned throughout the specification indicates a particular feature, structure, or characteristic related to the embodiment is included in at least one embodiment of the present disclosure. Therefore, the terms of "in an embodiment" or "in one embodiment" appearing throughout the specification are not necessarily referring to the same embodiment. Furthermore, the particular feature, structure, or characteristic may be combined in any suitable manner in one or more embodiments.

In addition, the terms "first" and "second" are only for descriptive purposes and cannot be understood as indicating or implying a relative importance or implicitly indicating the number of a technical feature indicated. A feature defined as "first" and "second" may explicitly or implicitly include one or more of the feature. In the description of the present disclosure, the term "plurality" refers to at least two, e.g., two, three, or more, unless otherwise specifically defined.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. A battery safety alert system comprising:
   a battery mounting member;
   a matching mechanism provided at a battery, the battery being configured to power a vehicle;
   a detection device configured to detect position information of an engagement mechanism provided at the battery mounting member, the detection device being provided at the matching mechanism; and
   a controller communicatively connected to the detection device and configured to:
   receive the position information;
   determine, based on the position information, whether the engagement mechanism is fully engaged with the matching mechanism; and
   during flight of the vehicle, generate alarm information in response to the engagement mechanism not being fully engaged with the matching mechanism.

2. The system of claim 1, wherein the detection device further includes a Hall detection device.

3. The system of claim 1, wherein the position information includes a movement distance of the engagement mechanism.

4. The system of claim 1, wherein the detection device includes a displacement detection device.

5. The system of claim 1, wherein:
   the engagement mechanism is slidable relative to the matching mechanism, and the position information includes a movement distance of the engagement mechanism.

6. The system of claim 1, wherein the controller is wiredly connected to the detection device.

7. The system of claim 6, wherein the controller is further configured to send out a prompt in response to a value detected by the detection device being smaller than or equal to a preset value.

8. The system of claim 6, wherein the controller is further configured to send out a prompt in response to a value detected by the detection device being greater than or equal to a preset value.

9. The system of claim 1, further comprising:
an alarm device communicatively connected to the controller and configured to prompt a user based on the alarm information, the alarm device including a display screen or a vibrator.

10. The system of claim 1, wherein the controller is further configured to send the alarm information to a flight controller of the vehicle or a remote controller of the vehicle.

11. The system of claim 10, wherein the alarm information instruct the flight controller of the vehicle or the remote controller of the vehicle to generate control information of whether to control the vehicle land.

12. The system of claim 10, wherein the controller is further configured to generate a prompt message in response to the vehicle having not taken off, the prompt message instructing the flight controller of the vehicle to control the vehicle to be disconnected with the battery or to forbit the vehicle from taking off.

13. The system of claim 1, wherein the controller is further configured to, in response to the engagement mechanism being fully engaged with the matching mechanism, generate a prompt message indicating that the engagement is in place.

14. The system of claim 1, wherein the detection device includes:
a hook configured to engage with a slot of the matching mechanism to fix the battery to the battery mounting member; and
an angle encoder connected to a rotation shaft of the hook of the engagement mechanism.

15. The system of claim 1, wherein:
the detection device includes:
two hooks respectively configured to engage with two slots of the matching mechanism to fix the battery to the battery mounting member; and
two micro switches in series in a circuit, arranged on two opposite sides of the battery, and configured to be respectively triggered by the two hooks; and
the controller is further configured to generate the alarm information in response to at least one of the two micro switches being off.

16. A battery configured to power a vehicle, comprising:
a casing; and
a battery safety alert system mounted at the casing and including:
a battery mounting member;
a matching mechanism provided at the battery;
a detection device configured to detect position information of an engagement mechanism provided at the battery mounting member, the detection device being provided at the matching mechanism; and
a controller communicatively connected to the detection device and configured to:
receive the position information;
determine, based on the position information, whether the engagement mechanism is fully engaged with the matching mechanism; and
during flight of the vehicle, generate alarm information in response to the engagement mechanism not being fully engaged with the matching mechanism.

17. The battery of claim 16, wherein the vehicle includes an unmanned aerial vehicle (UAV).

18. A vehicle comprising:
a battery mounting member;
a matching mechanism provided at a battery, the battery being configured to power the vehicle;
a detection device configured to detect position information of an engagement mechanism provided at the battery mounting member, the detection device being provided at the matching mechanism; and
at least one controller communicatively connected to the detection device and configured to:
receive the position information;
determine, based on the position information, whether the engagement mechanism is fully engaged with the matching mechanism; and
during flight of the vehicle, generate alarm information in response to the engagement mechanism not being fully engaged with the matching mechanism.

19. The system of claim 15, wherein each of the hooks is configured to:
slide into the corresponding slot to engage with the slot or slide out to separate from the slot, the detection device being provided at a bottom of the slot or near the slot; or
rotate to a first preset angle to engage with the slot or to a second preset angle to separate from the slot, the detection device being provided at a bottom of the slot or at an edge of the slot.

20. A battery safety alert method using the system of claim 1 and comprising:
detecting the position information of the engagement mechanism;
determining, based on the position information, whether the engagement mechanism is fully engaged with the matching mechanism; and
during the flight of the vehicle, generating alarm information in response to the engagement mechanism not being fully engaged with the matching mechanism.

* * * * *